United States Patent Office 3,456,407
Patented July 22, 1969

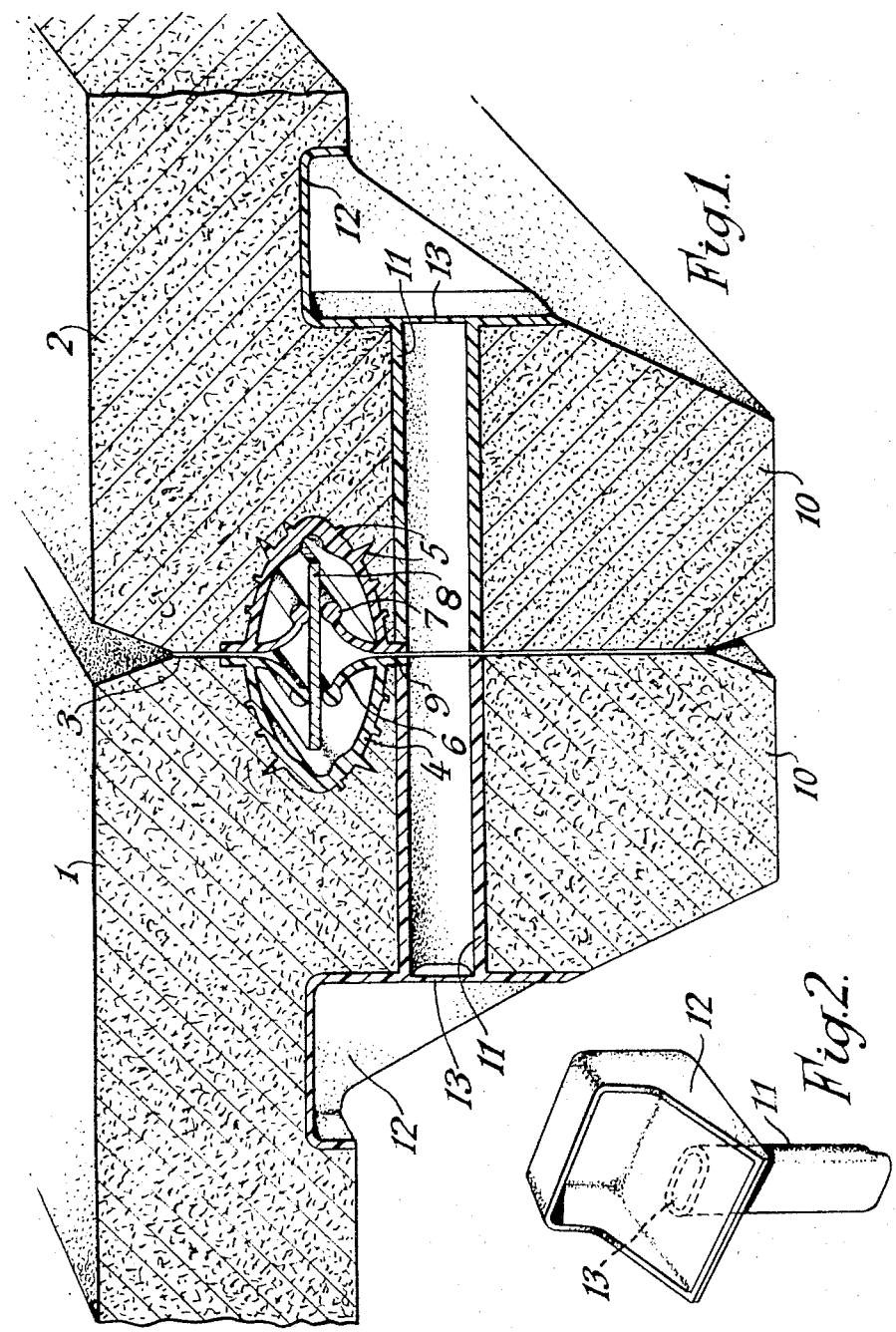

3,456,407
JOINING BUILDING UNITS
Colin H. Davidson, 3 Childs St.,
London, SW. 5, England
Filed Oct. 19, 1967, Ser. No. 676,425
Claims priority, application Great Britain, Oct. 25, 1966, 47,872/66
Int. Cl. E04b 1/62; E04c 5/07
U.S. Cl. 52—100
9 Claims

ABSTRACT OF THE DISCLOSURE

A weatherproof joint between components of buildings such as precast wall slabs, frames, or piers, in which are provided two elastomeric channel-like sections in grooves formed in the components, and these sections have opposed inturned lips which sealingly engage an inserted rigid strip. It also includes bolt-like means for tightening and securing such a joint.

---

This invention relates to joining building units. More specifically, it is concerned to provide a means and method for making weatherproof joints between the margins of juxtaposed slabs, blocks, columns, or in situ cast walls; and between such elements and window or door frames and other elements which are to be incorporated in a building.

The invention is primarily intended to be applied to preformed (e.g. precast) building units such as panels and other factory subassemblies or products; but the possibility is not excluded of applying it to in situ construction.

The invention aims mainly at the provision of a sealed joint between two marigns, or a margin and a surface of a highly effective, economic, and simply assembled nature. It also aims to provide a means of attachment for use in similar circumstances, which being again economic and simple, is highly adaptable and can be used as a standardised provision for interattaching preformed units.

In its first aspect, that is to say the provision of sealing in a joint, a surface or margin of a building unit (such as a slab, block, column, or prefabricated subassembly) has formed in it a groove and in the groove there is secured a lining of elastomeric material such as a resilient synthetic resin, which lining conforms approximately to the sectional shape of the groove and has two opposed flexible lips which, when unstrained meet or nearly meet across the groove, and which can bear resiliently to form a seal, against the sides of a strip of material which being inserted springs the lips apart.

Preferably a sealed joint consists of two such grooves and linings, and the inserted strip is a simple flat strip of such width as to extend well into the two grooves, being nipped in each by the corresponding lips; and the strip is preferably of relatively rigid synthetic resin. The strip may, however, be thickened at each end to guide it and prevent its escape from the "lips."

The lining, for preference, is an extrusion having a sectional shape like a wishbone or horseshoe, and its outer surface has ribs, keys, or other projections, so that when the liner is cast into the margin of a concrete block (as is intended) it is firmly fixed therein.

According to another feature of the invention, a building unit especially such as a panel, block, or slab, which is to be attached to an adjoining unit sufficiently tightly as to maintain an effective seal, has a ridge or flange formed projecting from one surface and along a mrgin, whether locally or along the whole length, and in this is formed a bore or hole to receive a bolt, dowel, or screw, there being an encastred recess into which the hole opens to give access by a tool to the head of such bolt or the like, and the bore and recess are inititally formed by moulding or casting into the unit a preformed fitting of the required shape. The fitting, which is preferably itself a moulding of synthetic resin or the like or of wet-resistant material, may have a relatively frangible diaphragm across the bore or the opening of the recess, so that when a particular fitting is not used for a bolt, the bore remains closed, but when use is made of the fitting it is simple merely to break the diaphragm.

The invention will be readily understood from the following description, with reference to the accompanying drawings which illustrate it by way of example. In these drawings FIGURE 1 shows the seal device, in a sectional view of a joint, and FIGURE 2 illustrates in perspective, one of the attachment-fittings used.

In FIGURE 1 it is shown that there are two units in the form of precast concrete panels 1 and 2, which have meeting marginal surfaces at 3. In each of these surfaces there is formed a groove of semi-oval section, and cast into the groove is a plastic liner 4 having external ribs 5 to key it with the concrete. Each such liner, which is made of a length of extruded section, presents inwardly a pair of lips 6 along the edges of which are beads 7. The lips 6 are resilient, and if left alone, would meet pressed together. When the two panels are in position, a seal strip 8 is inserted, either first into one liner and then the other, or by sliding it in endwise after the panels are positioned. The strip 8 is a single flat strip of hard plastic, and the beads 7 made a good seal by nipping upon it. The liners have marginal flanges 9, which may project slightly from the surfaces of the margins 3, and then be squeezed together, or they may merely maintain a very small space between the margins 3, useful to insulate vibration and allow for minor manufacturing inaccuracies.

The panels 1, 2, have running along their corresponding internal surfaces and along the margins 3, flanges or ridges 10 preferably of the tapered section shown. At selected locations in these, are positions for interattaching bolts. At each of these is cast in a fitting as shown in FIGURE 2. This comprises a tube 11 of somewhat oval section (to allow for minor assembly inaccuracies) and a recess 12 opening out of the flange 10. The outer end of the tube 11 is closed by a frangible diaphragm 13 to prevent ingress of dirt or moisture. When two such fittings are aligned as seen in FIGURE 1, a bolt can be pushed through from one to the other, and the recesses give access for tools to the head and the nut. Thus the joint between the two panels 1 and 2 can be pulled up and firmly made.

In other structures, the seal as above described is also useful. For example, when a margin 3 is to accommodate a window-frame, a course or flashing, for example aluminium strip, is used overlapping the window-frame, and having one edge nipped between the lips 6. Similar variations can be used in other locations and circumstances, such as the provision and sealing of damp courses, roof flashings, etc. Thus the invention, by the abilities to insert any flattish or sheet material, allows the fixing of appropriate flashings at any abutment between a component provided with the lining of the invention and any of a very wide range of other components or materials.

I claim:
1. A joint for use between a first and a second component of a building comprising
 a groove-defining surface formed in the first component
 a similar groove-defining surface formed in the second component
 two elastomeric elements, one such element being retained in each of the two grooves so defined, and each having elastically yieldable lips extending across the respective groove so as to have complementary adjacent margins and a substantially rigid strip-like element inserted between, and elastically springing apart the lips of both elements and being retained in sealing contact therewith.

2. A joint according to claim 1, further comprising a cast component having its said groove formed therein by casting, and having its said elastomeric element retained therein by casting, said element comprising integral keying means to retain the element in its respective groove.

3. A joint according to claim 1, further comprising an elastomeric element of substantially semi-oval hollow sectioned shape and integral lips collectively extending across the hollow thereof from approximately the edges of the section to meet in the plane of the major axis, and the said rigid element is located in that plane.

4. A joint according to claim 1 including two semi-oval sectioned elastomeric hollow mouldings each having two integral internal and inwardly-directed lips and two external flange-like edges abutting in the joint, each such moulding having external ribs keying it into the cast cementitious material of a building component.

5. A joint according to claim 1, further comprising complementary flanges on said first and second components, both flanges being perforated for the passage of bolt-like interattaching means the ends of which are received in cavities formed in the components.

6. A joint according to claim 5, further initially comprising readily frangible diaphragms closing the perforations.

7. A joint according to claim 5, further comprising preformed members defining the perforations and cavities adapted to be cast into the components.

8. A joint according to claim 1, in which each elastomeric element comprises a formation of plastics material having a wall defining semi-oval hollow section, and having external projections to key the element in a groove of a casting, a pair of outwardly directed flanges and a pair of inwardly directed lips extending from its margins, each said lip having a sectional shape terminating in a bulbous edge the bulbous edges being adapted to make sealed contact with the strip-like element.

9. A joint according to claim 8, in which the strip-like element is inserted endwise between said lips.

References Cited
UNITED STATES PATENTS

| | | | |
|---|---|---|---|
| 1,723,306 | 8/1929 | Sipe | 52—396 X |
| 1,964,131 | 6/1934 | Nelson et al. | 52—396 |
| 2,717,514 | 9/1955 | Meek | 52—396 |
| 3,068,763 | 12/1962 | Harza | 52—396 X |
| 3,374,703 | 3/1968 | Davis et al. | 52—586 X |

FOREIGN PATENTS 1,332,030　6/1963　France.

FRANK L. ABBOTT, Primary Examiner

PRICE C. FAW, Jr., Assistant Examiner

U.S. Cl. X.R.

52—396, 586; 94—18; 287—189.36